(12) United States Patent
Li et al.

(10) Patent No.: US 8,802,757 B2
(45) Date of Patent: Aug. 12, 2014

(54) VISCOSITY REGULATING COMPOSITION

(75) Inventors: Chunzhao Li, Chesterfield, NJ (US); Wilbur Mardis, Holland, PA (US); Richard Henderson, Clarksburg, MD (US); Daphne Benderly, Metuchen, NJ (US)

(73) Assignee: Elementis Specialties, Inc., East Windsor, NJ (US)

( * ) Notice: Subject to any disclaimer, the term of this patent is extended or adjusted under 35 U.S.C. 154(b) by 228 days.

(21) Appl. No.: 13/213,873

(22) Filed: Aug. 19, 2011

(65) Prior Publication Data

US 2012/0101199 A1    Apr. 26, 2012

Related U.S. Application Data

(60) Provisional application No. 61/375,559, filed on Aug. 20, 2010.

(51) Int. Cl.
*C08K 5/06* (2006.01)
*C08K 5/36* (2006.01)

(52) U.S. Cl.
USPC ........... 524/156; 524/591; 524/392; 524/378; 524/500

(58) Field of Classification Search
USPC .......................... 524/156, 591, 392, 500, 378
See application file for complete search history.

(56) References Cited

U.S. PATENT DOCUMENTS

| | | | |
|---|---|---|---|
| 4,327,008 A | 4/1982 | Schimmel et al. | |
| 4,882,408 A * | 11/1989 | Blum | ............................... 528/49 |
| 5,594,087 A | 1/1997 | Konig et al. | |
| 6,316,540 B1 | 11/2001 | Krafcik et al. | |
| 7,432,325 B2 | 10/2008 | Blankenship et al. | |
| 2002/0052441 A1 * | 5/2002 | Burdick et al. | ............... 524/501 |
| 2009/0247650 A1 | 10/2009 | Mougin et al. | |

FOREIGN PATENT DOCUMENTS

| | | |
|---|---|---|
| EP | 0761780 | 3/1997 |
| WO | 2007030626 | 3/2007 |
| WO | 2007048766 | 5/2007 |

OTHER PUBLICATIONS

International Search Report for International Patent Application No. PCT/US2011/48462, dated Jan. 6, 2012, 3 pages.
Publication for International Patent Application No. PCT/US2011/48462, dated Feb. 23, 2012, 50 pages.
Written Opinion for International Patent Application No. PCT/US2011/48462, dated Jan. 6, 2012, 5 pages.
Extended European Search Report issued in corresponding European Patent Application No. 118188432, dated Dec. 20, 2013, 10 pages.

* cited by examiner

*Primary Examiner* — Robert D. Harlan
(74) *Attorney, Agent, or Firm* — Morgan, Lewis & Bockius, LLP

(57) ABSTRACT

A viscosity regulating composition having a polymeric structure with an internal hydrophobic unit located within the polymer's backbone, multiple hydrophilic units, and terminal hydrophobic units. In one embodiment, the internal hydrophobic unit may have at least three linked hydrophobic segments, of the same or different hydrophobic segments, with the proviso that the multiple hydrophobic segments are not linked to each other by one or more hydrophilic linking segments, for example water-soluble, polymeric groups.

21 Claims, 1 Drawing Sheet

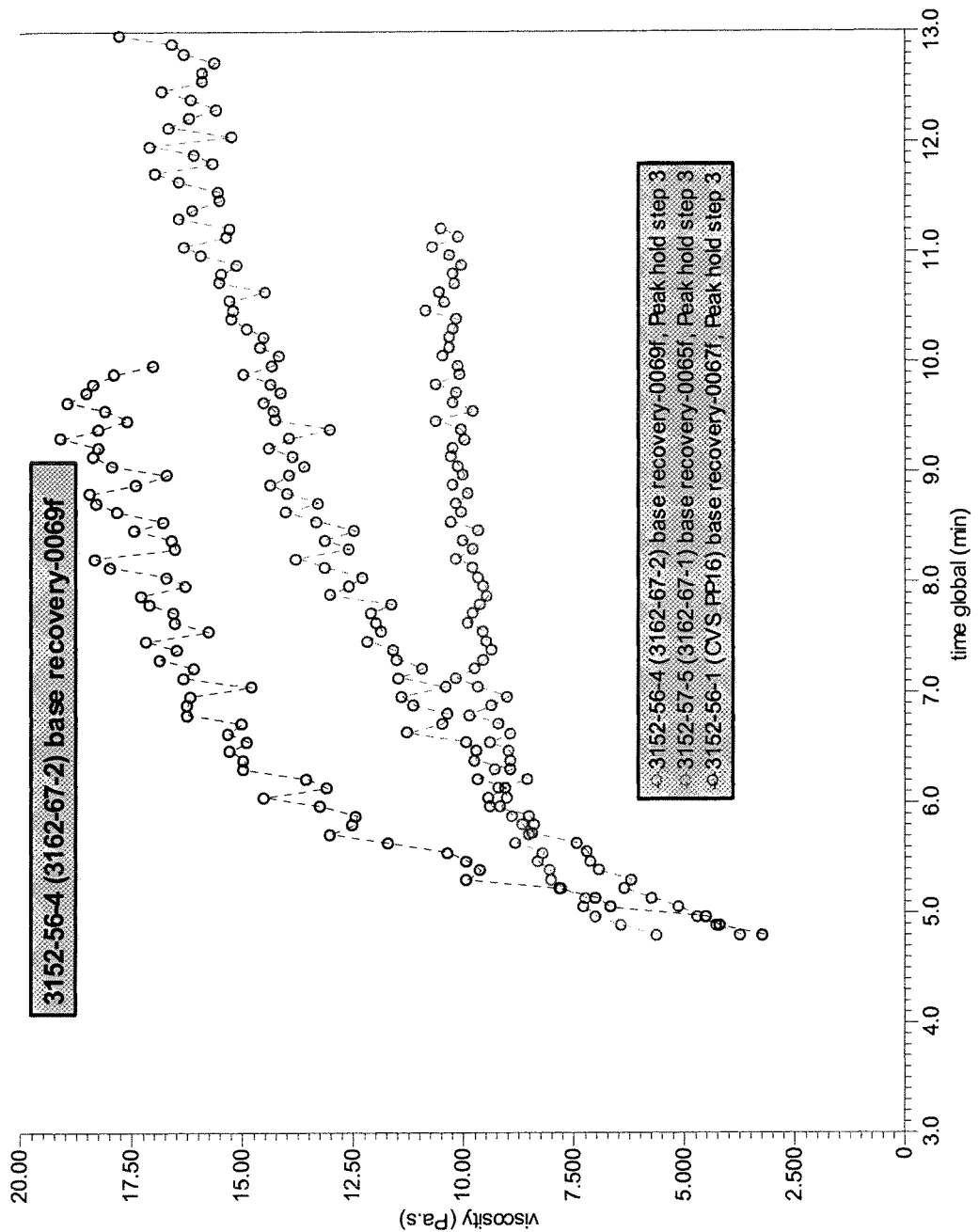

VISCOSITY REGULATING COMPOSITION

This application claims the benefit of U.S. Provisional Application No. 61/375,559 filed Aug. 20, 2010 which is incorporated herein by reference in its entirety.

FIELD OF THE INVENTION

The present invention relates to viscosity regulating compositions which is useful for modifying the rheological properties of paint formulations

BRIEF SUMMARY OF THE INVENTION

The present disclosure provides for a viscosity regulating composition including a polymer containing an internal hydrophobic unit located within the polymer's backbone; and one or more terminal hydrophobic units covalently connected to the internal hydrophobic unit. The internal hydrophobic unit has multiple hydrophobic segments which are not linked to each other by one or more polyether polyol linking units. The one or more terminal hydrophobic units contain from 12 to 29 carbon atoms exclusive of the linking group carbon atoms.

In one embodiment, the internal hydrophobic unit contains at least one linear, branched or alicyclic aliphatic diradical as a hydrophobic segment.

In one embodiment, the internal hydrophobic unit contains connected segments derived from a diisocyanate compound and a di-functional compound having isocyanate reactive functional moieties.

In one embodiment, the terminal hydrophobic unit contains at least one linear, branched or alicyclic aliphatic diradical as a hydrophobic segment.

In one embodiment, the terminal hydrophobic unit contains connected segments derived from a diisocyanate compound and a mono-functional compound having one isocyanate reactive functional reactive moiety wherein the connected segments are not linked to each other by one or more polyether polyol linking units.

In one embodiment, at least a portion of the terminal hydrophobic units are connected to one end of the internal hydrophobic unit by one or more hydrophilic linking units.

BRIEF DESCRIPTION OF THE DRAWINGS

The foregoing summary, as well as the following detailed description of the invention, will be better understood when read in conjunction with the appended drawings.

FIG. 1 illustrates the viscosity of a paint formulation with time following the application of a shear force.

DETAILED DESCRIPTION OF THE EMBODIMENTS

The present disclosure provides for a viscosity regulating composition which can be tailored to provide a desired viscosity response. The composition may have a polymeric structure with an internal hydrophobic unit located within the polymer's backbone, multiple hydrophilic units, and terminal hydrophobic units. In one embodiment, the internal hydrophobic unit may have at least three linked hydrophobic segments, of the same or different hydrophobic segments, with the proviso that the multiple hydrophobic segments are not linked to each other by one or more polyether polyol linking segments. In one embodiment, the internal hydrophobic unit contains from 24 carbon atoms to 60 carbon atoms; or from 24 carbon atoms to 38 carbon atoms (exclusive of the linking group carbon atoms, e.g., carbonyl carbons). In another embodiment, a terminal hydrophobic unit is connected to one end of the internal hydrophobic unit by one or more hydrophilic linking units. In another embodiment, a terminal hydrophobic unit is directly connected to one end of the internal hydrophobic unit. In another embodiment, the terminal and internal hydrophobic units contain no protonatable functional groups. In another embodiment, the terminal hydrophobic unit contains from 12 carbon atoms to 29 carbon atoms exclusive of the linking group carbon atoms. In another embodiment, the terminal hydrophobic unit contains connected segments, wherein the connected segments are not linked to one another by one or more polyether polyol units.

In one embodiment, the mid-shear viscosity regulating composition may have the following structure (Formula 1):

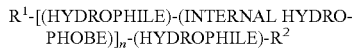

wherein $R^1$ and $R^2$ are terminal hydrophobic groups each having from 12 to 29 carbon atoms (exclusive of the linking group carbon atoms, e.g., carbonyl carbons), n may have average values of: 1 to 4; 1 to 2; or 1. In such embodiments, the internal hydrophobic unit contains; 24 carbon atoms to 60 carbon atoms; or from 24 carbon atoms to 38 carbon atoms (exclusive of the linking group carbon atoms, e.g., carbonyl carbons).

In one embodiment, the internal hydrophobic unit may have a structure of:

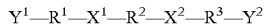              Formula 2 wherein $R^1$ and $R^3$ may be linear, branched or alicylic aliphatic functional groups and $R^2$ may be a linear aliphatic functional group or an aliphatic functional group having a pendent aliphatic group. In one embodiment, $R^1$ and $R^3$ may have from: 6 to 13 carbon atoms; 6 to 10 carbon atoms; 10 carbon atoms; and 6 carbon atoms (each exclusive of the linking group carbon atoms, e.g., carbonyl carbons). In one embodiment, $R^2$ may have from: 8 to 48 carbon atoms; 6 to 16 carbon atoms; and 8 to 12 carbon atoms. In one embodiment, $X^1$ and $X^2$ are connecting functional groups. In one embodiment, the connecting functional groups include an amido functional group (—C(=O)—NH), urethane functional group (O—C(=O)—NH), urea functional group (N(R)—C(=O)—NH) or mixtures thereof. (The carbon atoms in the connecting functional groups are not included in the carbon counts for the internal hydrophobe.) In one such embodiment, the $X^1$ and $X^2$ connecting functional groups may be urethane functional groups. In another embodiment, $X^1$ and $X^2$ include di- or tri-functional compounds containing one or more heteroatoms, typically oxygen and/or nitrogen and having formula weights (FW) of 14-74, except that nitrogen atoms of ureas and amines may also be substituted with a monofunctional alkyl groups having 1-8 carbon atoms and with the proviso that the linking functional moieties are not ethylene or propylene polyethers. The presence of such linking functional moieties will not render the internal hydrophobic unit any hydrophilic properties. $Y^1$ and $Y^2$ are diradicals which connect the internal hydrophobic unit to a hydrophilic linking unit, in one embodiment, or to another internal hydrophobic unit, in another embodiment. In one such embodiment, $Y^1$ and $Y^2$ include linking functional groups independently selected from amido functional group (—C(=O)—NH), urethane functional group (O—C(=O)—NH), urea functional group (N(R)—C(=O)—NH) or linking groups of —O—, —C(=O)O—, —NH—, and mixtures thereof. In one such embodiment, the $Y^1$ and $Y^2$ linking functional groups may be urethane functional groups.

One of ordinary skill in the art would appreciate that several ways of making ether linking groups exist in the art. Reactants such as dialoakanes, trihaloalkanes and exposides may be used to make ether linking groups. Examples of reactants that may be used to make ether linking groups include dihalogenmethanes, such as dibromomethane and dichloromethane; 1,1-dichlorotoluene, 1,1-dichloroethane, 1,1 dibromomethane; epihalohydrins such as epichlorohydrin, epibromohydrin, and epiiodohydrin; trihaloalkanes; mono- or di-glycidyl ethers of various diols, such as ethylene glycol, propylene glycol, polyethylene glycol, polypropylene glycol, 1,4-butanediol, 1,6-hexanediol, bisphenol A, bisphenol F, and cyclohexanedimethanol. Examples of other suitable halogen containing compounds include epihalohydrins, such as epichlorohydrin, epibromohydrin, and epiiodohydrin; and trihaloalkanes such as 1,2,3-trichloropropane, 1,2,4-trichlorobutane, and 1,3,6-trichlorohexane, as well as trihaloalkanes containing one or more bromine or iodine atoms.

In one embodiment, the internal hydrophobic unit contains connected segments derived from a diisocyanate compound and at least one di-functional compound whose functional moieties are isocyanate reactive. In another embodiment, the internal hydrophobic unit is the reaction product(s) of one or more diisocyanate compounds and one or more di-functional compounds wherein the functional moieties are isocyanate reactive. In such embodiments, the internal hydrophobic unit contains at least three aliphatic di-radical segments connected by functional groups and each end is terminated by a terminal mono-functional unit capable of undergoing a condensation reaction. In such embodiments, the terminal end of the internal hydrophobic unit is terminated by an isocyanate group, a hydroxyl group, an amine group, carboxylic acid group or mixtures thereof. In one such embodiment, the terminal end of the internal hydrophobic unit is end terminated by an isocyanate group. In another such embodiment, the terminal end of the internal hydrophobic unit is end terminated by a hydroxyl group. In another embodiment, at least one hydrophobic segment is derived from a di-functional compound containing from 6 to 16 carbon atoms. In another embodiment, at least one hydrophobic segment is derived from a linear aliphatic diol. In one such embodiment, at least one hydrophobic segment is derived from a di-functional compound including 1,8-octanediol, 1,10-decanediol, 1,12-dodecanediol, 1,14-tetradecanediol and 1,16-hexadecanediol and mixtures thereof. In another embodiment, the internal hydrophobic unit contains an aliphatic diradical having a pendent substituent as a hydrophobic segment. In one such embodiment, such aliphatic diradical was derived from a di-functional compound having one terminal isocyanate reactive functional moiety and one non-terminal isocyanate reactive functional moiety. In another such embodiment, the aliphatic diradical having a pendent substituent may be derived from an aliphatic diol having one terminal hydroxyl group and one non-terminal hydroxyl group. In one such embodiment, the aliphatic diol may have 6 to 10 carbon atoms. In one such embodiment, the aliphatic diol includes 1,2-hexanediol, 1,2-octanediol and 1,2-decanediol. In another embodiment, the aliphatic diradical is derived from a di-functional compound having two non-terminal isocyanate reactive moieties.

In one embodiment, the internal hydrophobic unit may have at least three linked hydrophobic segments with the proviso that the multiple hydrophobic segments are not linked to each other by one or more polyether polyols. In one such embodiment, the excluded polyether polyol units include a polyethylene oxide polymer or a polyethylene oxide-polypropylene oxide copolymer. In another embodiment, the polyether polyols have molecular weights ranging from about 1000 to about 10,000.

In another embodiment, the internal hydrophobe unit may have the structure of:

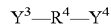

wherein $R^4$ has 32 to 36 carbon atoms. In one such embodiment, $R^4$ may be derived from a dimer-diol having two terminal hydroxyl groups and 32 to 36 carbon atoms. $Y^3$ and $Y^4$ may include linking functional groups independently selected from amido functional group (—C(=O)—NH), urethane functional group (O—C(=O)—NH), urea functional group (N(R)—C(=O)—NH) or linking groups of —O—, —C(=O)O—, —NH—, and mixtures thereof. In one embodiment, $Y^3$ and $Y^4$ may be an —O— linking group.

In one embodiment, the terminal hydrophobic unit may contain connected segments derived from a diisocyanate compound and a compound which is mono-functional with respect to reaction with the diisocyanate compound. In another embodiment, the terminal hydrophobic unit is the reaction product(s) of one or more diisocyanate compounds and one or more mono-functional compounds wherein the functional moieties are isocyanate reactive. In such embodiments, the mono-functional compounds may include linear, branched, or alicylic aliphatic groups having an isocyanate reactive moiety such as a hydroxyl group. In another embodiment, the mono-functional compounds may include linear aliphatic groups having an isocyanate reactive moiety such as a hydroxyl group. In another such embodiment, the mono-functional compound includes a linear, branched, or alicylic aliphatic alcohol having 6 to 16 carbon atoms. In yet another such embodiment, the mono-functional compound includes a linear aliphatic alcohol having 6 to 16 carbon atoms. In one embodiment, the linear or branched aliphatic alcohol includes 2-ethylhexanol, 1-octanol, 1-decanol, 1-dodecanol, 1-tetradecanol, 1-hexadecanol, 2-butyloctanol and 2-hexyldecanol. In another embodiment the aliphatic alcohol is selected from the group consisting of di-n-octylaminoethanol, di-2-ethylhexylaminoethanol, di-hexylaminoethanol, 2-(diphenylphosphino)ethylamine, 2-(dioctylamino)-ethanol, and 2-(diethylhexylamino)-ethanol. In another embodiment, the monofunctional compound is a primary amine, a secondary amine or a tertiary amine. Examples include octylamine, decylamine, dodecylamine, and N-methyl-N-octadecylamine. Examples of reagents that can be used to generate hydrophobic groups comprising at least one secondary amine functionality include N-octylethylenediamine, N-dodecyl-ethylene-diamine, N-octylaminoethanol, N-dodecylaminoethanol, and 2-(2,2,6,6-tetramethyl-4-piperidinyl)ethanol. Alternative routes to generate hydrophobic groups comprising at least one secondary amine functionality include the reaction of primary amines, such as octylamine, decylamine, and iso-tridecylamine, with an alkylhalide, epoxide, or aminoplast reagent. These reagents would be used to provide hydrophobic groups on the ends of polymer chains. Further examples of reagents that can be used to generate hydrophobic groups comprising at least one tertiary amine functionality include the corresponding amine oxides of the above, for example, 2-(dibutylamino)ethanol N-oxide, 2-(dioctylamino)ethanol N-oxide, and N-benzyl 3-hydroxypiperidine N-oxide.

In some embodiments, the mono-functional compound may include 1-decanol, 2-(n-butyl)-1-octanol, 2-ethylhexanol, 1-nonanol, 1-dodecanol and mixtures thereof. In one embodiment, the terminal hydrophobic unit contains at least two aliphatic di-radical segments connected by functional groups and at least one end is terminated by a terminal monofunctional segment capable of undergoing a condensation reaction. In one embodiment, the terminal mono-functional segment is end terminated by a hydroxyl group, an amine group, ester group, an isocyanate group or mixtures thereof. In one such embodiment, the terminal mono-functional segment is end terminated by a hydroxyl group. In one such embodiment, the mono-terminal functional segment is end terminated by an isocyanate group. In one such embodiment, the terminal hydrophobic unit contains from 12 to 29 carbon atoms (exclusive of the linking group carbon atoms, e.g., carbonyl carbons). In one embodiment, the terminal hydrophobic unit may have two hydrophobic segments linked by a functional group independently selected from an amido functional group (—R—C(=O)—NH), urethane functional group (O—R—C(=O)—NH), urea functional group (NR—C(=O)—NH) or mixtures thereof. In one such embodiment, the linking group is a urethane group.

In another embodiment, each terminal hydrophobic unit is derived from a compound having at least 17 contiguous carbon atoms which is monofunctional with respect to condensation reactions. Examples include octadecyl isocyanate, stearic acid, octadecylamine, octadecanol and 1,2-epoxyoctadecane.

A variety of diisocyante compounds may be used to generate hydrophobic segments of the internal hydrophobic unit and/or the terminal hydrophobic unit. In one embodiment, diisocyanate compounds include hexamethylene diisocyanate ("HDI"), trimethyl hexamethylene diisocyanate ("TMDI"), isophorone diisocyanate ("IPDI"), tetramethyl xylylene diisocyanate ("TMXDI"), 4,4'-methylene bis(cyclohexylisocyanate) ("DESDOMUR® W) and mixtures thereof. In some embodiments, the diisocyanate compound may be isophorone diisocyanate. In other embodiments, the diisocyanate compound may be hexamethylene diisocyanate. In still yet other embodiments, the diisocyanate compound may be 4,4'-methylene bis(cyclohexylisocyanate).

In one embodiment, the terminal hydrophobic unit may have at least two linked hydrophobic segments with the proviso that the multiple hydrophobic segments are not linked to each other by one or more polyether polyols. In one such embodiment, the excluded polyether polyol units include a polyethylene oxide polymer or a polyethylene oxide-polypropylene oxide copolymer. In another embodiment, the polyether polyols have molecular weights ranging from about 1000 to about 10,000.

For the viscosity regulating compositions described herein, a terminal hydrophobic unit may be linked to the internal hydrophobic unit by one or more hydrophilic linking groups which can be based on a variety of compositions. For example, a polyether such as a polyoxyalkylene, a polyacrylamide, a polymethacrylamide, a polysaccharide, a polyvinyl alcohol, a polyvinyl alkyl ether, or a polyvinyl pyrrolidone.

In one embodiment, the hydrophilic linking group may have an average number of carbon atoms which is 6 to 18 times greater than the average number of carbon atoms (exclusive of the linking group carbon atoms, e.g., carbonyl carbons) in the internal hydrophobic group. In one such embodiment, the hydrophilic group is derived from a polyethylene oxide polymer or a polyethylene oxide-polypropylene oxide copolymer, hereinafter designated polyoxyalkylene chains or polyoxyalkylene polymers where the term "oxyalkylene" refers to units having the structure —(O-A)-, with O-A represents the monomeric residue of the polymerization reaction product of $C_{2-8}$ alkylene oxides or diols. Examples of oxyalkylenes include, but are not limited to: oxyethylene with the structure —(OCH$_2$CH$_2$); oxypropylene with the structure (OCH(CH$_3$)CH$_2$— or —(OCH$_2$(CH—)CH$_3$; oxytrimethylene with the structure —(OCH$_2$CH$_2$CH$_2$)—; and 1,4-oxybutylene with the general structure —(OC$_4$H$_8$). Polymers containing these units are referred to as "polyoxyalkylenes." The polyoxyalkylene units can be homopolymeric or copolymeric. Examples of homopolymers of polyoxyalkylenes include, but are not limited to polyoxyethylene, which contains units of oxyethylene; polyoxypropylene, which contains units of oxypropylene; polyoxytrimethylene, which contains units of oxytrimethylene; and polyoxybutylene, which contains units of oxybutylene. Examples of polyoxybutylene include a homopolymer containing units of 1,2-oxybutylene, —(OCH(C$_2$H$_5$)CH$_2$); and polytetrahydrofuran, a homopolymer containing units of 1,4-oxybutylene, or —(OCH$_2$CH$_2$CH$_2$CH$_2$)—. The polyoxyalkylene compounds, independent of monomer composition, may be water soluble.

In other embodiments, the polyoxyalkylene chains have a nominal number average molecular weight ranging from 5,000-10,000 g/mole. In another embodiment, the polyoxyalkylene chains have a number average molecular weight of up to about 7,000-9,000 g/mole. In certain embodiments, the polyoxyalkylene polymer may have from about 155 to about 225 ethylene oxide repeat units. In some embodiments, the polyoxyalkylene may have 135 to about 205 ethylene oxide repeat units.

In other embodiments, the polyoxyalkylene units can be copolymeric, containing two or more different oxyalkylene segments. The different oxyalkylene groups can be arranged randomly to form a random polyoxyalkylene; or can be arranged in blocks to form a block polyoxyalkylene. Block polyoxyalkylene polymers have two or more neighboring polymer blocks, wherein each of the neighboring polymer blocks contain different oxyalkylene segments, and each polymer block contains at least two of the same oxyalkylene segments. In one such embodiment, an oxyalkylene group is oxyethylene.

In one embodiment, the hydrophilic linking group may include a (co)polymer comprising esters of acrylic acid or esters of methacrylic acid wherein acrylic acid and methacrylic acid may collectively be referred to as (meth)acrylic acid and the related esters may collectively be referred to as esters of (meth)acrylic acid, or as (meth)acrylates. Examples of suitable esters of (meth)acrylic acid include hydroxyethyl (meth)acrylate, that is, HEA or HEMA.

In other embodiments, the polyoxyalkylene groups are linked with a gem-dihalide reagent, hydrophobically modified polyacetal polyether and polyketal polyether associative thickeners are generated. Suitable gem-dihalide reagents include dihalogenomethanes, such as dibromomethane and dichloromethane; 1,1-dichlorotoluene, 1,1-dichloroethane, and 1,1-dibromomethane. When the polyoxyalkylene units are linked with an aminoplast reagent, a hydrophobically modified polyaminoplast polyether associative thickener is generated. When polyoxyalkylene units are linked with an epihalohydrin or trihaloalkane reagent, a hydrophobically modified polyEPI polyether associative thickener is generated, where EPI represents the residue of an epihalohydrin reagent's or a trihaloalkane reagent's reaction with amines, alcohols, or mercaptans.

In still yet another embodiment, the hydrophilic linking group may be a based on a polysaccharide generating a cellulosic linking group, for example a hydroxy ethyl cellulose.

The present disclosure further provides for an aqueous thickening composition containing a viscosity regulating component, having various embodiments as described herein, a viscosity suppressant and water. In some embodiments, the viscosity suppressant is an organic solvent such as butoxyethanol, diethylene glycol monobutyl ether, triethylene glycol monobutyl ether, propylene glycol, and other water miscible organic solvents. In other embodiments, the viscosity suppressant is an inorganic salt such as sodium chloride. In still other embodiments, the viscosity suppressant is a nonionic or anionic surfactant. In some embodiments, the aqueous thickening composition may have a viscosity of up to: 2500 cP; 5000 cP; 10,000 cP; 15,000 cP; 20,000 cP; or 25,000 cP. In one such embodiment, the composition may have a viscosity ranging from: 10 to 2500 cP; 10 to 5000 cP; 10 to 10000 cP; 10 to 15,000 cP; 10 to 20,000 cP.; or 10 to 25,000 cP. Brookfield viscosities of such compositions are measured at 25° C. and 10 RPM using a Brookfield RV or RVT. Typically a #1 spindle is used for materials having a Brookfield viscosity of 400-600 cP (40-60 dial reading), a #2 spindle is used for materials having a Brookfield viscosity of 1600-2400 cP and a #3 spindle is used for materials having a Brookfield viscosity of 4000-6000 cP. The following table may also be used to determine the appropriate spindle to use when measuring Brookfield viscosity at 25° C. and 10 RPM:

| Spindle | Factor | Viscosity (cP) | |
|---|---|---|---|
| | | Mid-dial | Max |
| 1 | 10 | 500 | 1000 |
| 2 | 40 | 2000 | 4000 |
| 3 | 100 | 5000 | 10000 |
| 4 | 200 | 10000 | 20000 |
| 5 | 400 | 20000 | 40000 |
| 6 | 1000 | 50000 | 100000 |
| 7 | 4000 | 200000 | 400000 |

In some embodiments, the aqueous thickening composition may contain 15-30 wt. % of the viscosity regulating component, 5-25 wt. % of a viscosity suppressant; and at least 45 wt. % of water. In one embodiment, each nonionic surfactant and anionic surfactant includes one or more hydrophobic group(s) and hydrophilic group(s), each of said hydrophobic group(s) having from: 6 carbon atoms to 10 carbon atoms; or 6 carbon atoms to 8 carbon atoms. In one embodiment, the anionic surfactant includes $M^+$(2-ethylhexyl sulfate$^-$); $M^+$(hexylsulfate$^-$); $M^+$(octylsulfate$^-$) and $M^+$(dioctyl sulfosuccinate$^-$), and mixtures thereof, where $M^+$ includes $NH_4^+$, $Na^+$ and K. In another embodiment, the anionic surfactant includes sodium 2-ethylhexyl sulfate; sodium hexylsulfate; sodium octylsulfate, sodium dioctyl sulfosuccinate; ammonium 2-ethylhexyl sulfate; ammonium hexylsulfate; ammonium octylsulfate, ammonium dioctyl sulfosuccinate and mixtures thereof. In another embodiment, the anionic surfactant includes sodium 2-ethylhexyl sulfate; sodium octylsulfate, sodium dioctyl sulfosuccinate and mixtures thereof. In another embodiment, the nonionic surfactant is 2-ethylhexyl ethoxylate having 2-5 moles ethylene oxide.

Paint Formulation

A variety of paint formulations may be formulated using the viscosity regulating compositions and/or an aqueous thickening compositions, as described herein. In one embodiment, a paint formulation includes: 10-40 wt. % solids of a resin system; 0.0-2.0 wt. % actives of an associative thickener; 0.1-2.0 wt. % actives of a viscosity regulating composition according to the various embodiments discussed herein; and optionally 7-12 wt. % of a colorant composition.

In one embodiment, a paint formulation may include the viscosity regulating compositions and/or a aqueous thickening compositions and a resin film forming binder, resulting in a paint formulation which may have a Stormer viscosity value ranging from 80-130 KU, an ICI viscosity value ranging from 0.1 to 2.5 Poise, and when applied to a substrate produces a film having a leveling value of at least 7 (ASTM D 4062-99) and a sag value of at least 12 mils (ASTM D4400-99). In another embodiment, a paint formulation may include the viscosity regulating compositions and/or an aqueous thickening compositions and a resin film forming binder, resulting in a paint formulation which may have a Stormer viscosity value ranging from 80-130 KU, an ICI viscosity value ranging from 0.1 to 4.5 Poise, and when applied to a substrate produces a film having a leveling value of at least 7 (ASTM D 4062-99) and a sag value of at least 12 mils (ASTM D4400-99). In yet another embodiment, a paint formulation may include the viscosity regulating compositions and/or an aqueous thickening compositions, a resin film forming binder and an ICI associative thickener, resulting in a paint formulation which may have a Stormer viscosity value ranging from 90-120 KU, an ICI viscosity value ranging from 1 to 2.5 Poise, and when applied to a substrate produces a film having a leveling value of at least 7 (ASTM D 4062-99) and a sag value of at least 12 mils (ASTM D4400-99). In still yet another embodiment, a paint formulation may include the viscosity regulating compositions and/or an aqueous thickening compositions, a resin film forming binder and an ICI associative thickener, resulting in a paint formulation which may have a Stormer viscosity value ranging from 90-120 KU, an ICI viscosity value ranging from 1 to 4.5 Poise, and when applied to a substrate produces a film having a leveling value of at least 7 (ASTM D 4062-99) and a sag value of at least 12 mils (ASTM D4400-99).

Such paint formulations may be also resistant to viscosity change upon addition of a colorant composition. Resistance to viscosity change is independent of the direction of change in viscosity upon colorant addition (that is, the viscosity may increase or decrease on colorant addition) or the specific identity of colorant used. The composition of a colorant is discussed below. By resistant to viscosity change, we mean that the Stormer viscosity of a such a paint formulation having an initial Stormer viscosity of 90-120 Krebs Units (KU) changes by: less than about 30 KU; in some embodiments less than about 25 KU; in some embodiments less than about 20 KU; in some embodiments less than about 15 KU; and in some embodiments by less than about 10 KU, upon addition of 12 ounces of a colorant per gallon of a base paint or tint base.

In another embodiment, the viscosity regulating composition, and/or aqueous thickening compositions described herein, may be used to thicken a colorant containing paint formulation which includes a resin film forming binder and a colorant composition, wherein the colorant containing paint formulation may have a Stormer viscosity value ranging from 80-130 KU, an ICI viscosity value ranging from 0.1 to 2.5 Poise. In another embodiment, the viscosity regulating composition, and/or aqueous thickening compositions described herein, may be used to thicken a colorant containing paint formulation which includes a resin film forming binder, a colorant composition and an ICI associative thickener, wherein the colorant containing paint formulation may have a Stormer viscosity value ranging from 90-120 KU, an ICI viscosity value ranging from 1 to 2.5 Poise. In one embodiment, the leveling value of the paint formulation, when applied to a substrate, is improved with no loss in sag resistance relative to an otherwise equivalent composition with a thickener not having an internal hydrophobic unit. In another embodiment, the paint formulation, when applied to a substrate produces a film having a leveling value of at least 5 and a sag value of at least 12 mils. In another embodiment, the paint formulation, when applied to a substrate produces a film having a leveling value of at least 8 and a sag value of at least 14 mils. In one embodiment, the paint system includes 10-40 wt. % of a resin film forming binder solids, 7-12 wt. % of a colorant composition; 0.0-2.0 wt. % actives of an associative thickener; and 0.1-2.0 wt. % actives of a viscosity regulating composition described herein.

Resin Film Forming Binders

A paint formulation of some embodiments of the present invention may include one or more resin film forming binders. A binder, or resin, is the actual film forming component of paint. It is an essential component of a base paint; and other components listed herein are included optionally, depending on the desired properties of the cured film. Binders can be categorized according to drying, or curing mechanism. The four most common are simple solvent evaporation, oxidative crosslinking, catalyzed polymerization, and coalescence.

In some embodiments, the resin binder is a water dispersible resin, such as a water dispersible alkyd or water dispersible polyurethane. In some embodiments, the resin binder is a water soluble resin. In certain embodiments, the resin binder is an emulsion resin, such as is typically used to manufacture latex paints. In certain embodiments, the resin includes a hydrophobic resin. Representative hydrophobic emulsion resins may include (meth)acrylic resin, a styrene acrylic resin, a styrene resin or other ethylenically unsaturated monomers. Representative examples of hydrophilic emulsion resins may include a vinyl acrylic resin or a vinyl acetate ethylene resin. In certain embodiments, the resin may have a substantially spherical shape and a large particle size or low surface area. In one embodiment, the particle size may be greater than about 200 nm. In a further embodiment, the particle size ranges from about 220 nm to about 650 nm. In certain embodiments, the resin may have a substantially spherical shape and small particle size or high surface area. In one embodiment, the particle size may be less than about 200 nm. In a further embodiment, the particle size ranges from about 80 nm to about 180 nm. In certain embodiments, the resin may have a multilobe shape. Representative resins may include Optive 130 (BASF, acrylic, 160 nm), UCAR 300 (Dow, vinyl acrylic, 260 nm), UCAR 625 (Dow, acrylic, 340 nm), Rhoplex ML-200 (Rohm & Haas, acrylic, 590 nm multilobe), and Neocryl XK-90 (DSM Neoresins, acrylic, 90 nm). In certain embodiments, combinations of resins are used to prepare the base paint.

Associative Thickeners

The paint formulation may also include at least one associative thickener. Associative thickeners are water soluble, water dispersible, or water swellable polymers that have chemically attached hydrophobic groups. In certain embodiments, a paint formulation includes a condensation polymer associative thickener including but not limited to polyether polyurethanes, polyether polyols, polyether polyacetals, polyether aminoplasts and the like. In some embodiments, a paint formulation includes about 0.05 wt % to about 5 wt % as active polymer of a condensation polymer associative thickener, about 0.1 wt % to about 3 wt % as active polymer of a condensation polymer associative thickener, or about 0.2 wt % to about 1 wt % as active polymer of a condensation polymer associative thickener.

In other embodiments, the associative thickeners include nonionic hydrophobically modified materials including nonionic hydrophobically-modified ethylene oxide urethane copolymers, nonionic hydrophobically-modified ethylene oxide ether copolymers, nonionic hydrophobically-modified ethylene oxide glycouril copolymers, hydrophobically-modified alkali soluble emulsions, hydrophobically-modified poly (meth)acrylic acids, hydrophobically-modified hydroxyethyl cellulose, and hydrophobically-modified poly(acrylamide), and mixtures thereof. The number average molecular weights of the associative thickeners may range from about 10,000 to about 500,000 g/mole or more, depending on the chemical type of associative thickener. In some embodiments, the number average molecular weight of the associate thickeners may range from about 10,000 to about 50,000 g/mole. In some embodiments, the number average molecular weight of the associate thickeners may range from about 100,000 to about 300,000 g/mole. In some embodiments, the number average molecular weight of the associate thickeners may range from about 400,000 to about 500,000 g/mole or more.

In another embodiment, the associative thickener may include an ICI associative thickener which is used to increase the high shear viscosity of a composition.

Colorant

A colorant containing paint formulation of the present invention may also include any suitable colorant. In some embodiments, a predispersed colorant may be added to a paint formulation. It is to be understood that this invention is equally effective with single colorants or mixtures of colorants.

Within the context of this invention, a colorant or colorant compound may include one or more colored pigment(s) which have been dispersed in an aqueous or water-miscible medium external to the paint in which it is intended to be used by use of mechanical energy, i.e., grinding or shearing by means of dispersing equipment such as, for example, a ball mill and a sand mill and then dispersed into a base paint. For the purposes of this disclosure, colorant does not include pigments in a dry undispersed state. The dispersion process is typically be achieved by the use of auxiliary compounds such as, for example, surfactants, wetting agents, water-miscible solvents, and dispersants, in addition to mechanical energy. The aqueous or water-miscible medium may also include glycols such as ethylene glycol and propylene glycol, and alcohols such as isopropanol. Dispersants may include polyethylene oxide polymers, polyethylene oxide glycols and others. The aqueous or water-miscible medium may also include extenders such as talc and calcium carbonate; humectants; thickeners; defoamer; and biocides. Such colorants are frequently added to a base paint or tint base at the point-of-sale to produce custom colors.

Pigments which are commonly used to prepare colorants include one or more inorganic or organic pigments, or metal effect agents, or combinations thereof. Examples of suitable pigments include titanium dioxide white, carbon black, lamp black, black iron oxide, red iron oxide, yellow iron oxide, brown iron oxide (a blend of red and yellow oxide with black), phthalocyanine green, phthalocyanine blue, organic red pigment (such as naphthol red, quinacridone red and toluidine red), quinacridone magenta, quinacridone violet, DNA orange, and organic yellow pigment (such as Hansa yellow) and combinations thereof.

The colorants are usually sold in concentrated form (typically 25% to 75% solids by weight) so that modest amounts can be used in a waterborne coating composition to provide a desired range of color intensities while not compromising the properties of the waterborne coating composition unduly. Typical amounts of colorants which are used in architectural coatings are from 2 to 4 fluid ounces of colorant per gallon of base paint for light tint bases and pastels, from 4 to 8 fluid ounces of colorant per gallon of base paint for medium tint bases, and from 6 to 16 fluid ounces of colorant per gallon of base paint for deep tone tint bases. Of course, different colorants and mixtures thereof are frequently used to provide wide latitude in color selection. Such colorants are frequently added to a base paint at the point-of-purchase of the colored paint, such as a paint store, followed by admixing the colorant and the waterborne coating composition by various means such as shaking the can of paint.

Additional Additives

A paint system of some embodiments of the present invention may include additional components as suitable to achieve the desire effect, including but not limited to wetting agents, surfactants, solvents, and other rheology control agents, pH adjusting agents, anti-skinning agents, pigments and fillers, salts, buffers, biocides, mildewcides, defoamers, corrosion inhibitor, adhesion promoters, humectants, anti-freezing agents, drying agents, crosslinking agents, and the like.

Methods of Use

The present disclosure provides for a method for balancing sag and leveling values of a paint formulation containing the viscosity regulating compositions described herein. The method includes the step of: providing a paint formulation including the following ingredients: a resin film forming binder; a viscosity regulating composition; a colorant, and optionally a KU and/or an ICI viscosity building associative thickener, wherein when applied to a substrate the paint formulation produces a film having a leveling value of at least 7 and a sag value of at least 12 mils. The various embodiments of the viscosity regulating composition are discussed herein above.

A variety of methods were used to characterize the physical properties of exemplary mid-shear viscosity regulating compositions, aqueous thickening compositions and paints. The methods are described below.

Mid-shear viscosity relates to the in-can appearance and is typically measured in Krebs units (KU) using a Stormer viscometer. Mid-shear or Stormer viscosity was measured by the test method described in ASTM D562-01 "Standard Test Method Consistency of Paints Measuring Krebs Unit (KU) Viscosity Using a Stormer-Type Viscometer."

ICI viscosity represents the viscosity of the paint during typical brush and roller application conditions. It is typically measured at 10,000 sec$^{-1}$ by the test method described in ASTM D4287-00 "Standard Test Method for High-Shear Viscosity Using a Cone/Plate Viscometer."

The sag and leveling properties of a film, on a substrate, formed by application of a paint formulation, containing the mid-shear regulating composition, were also measured. Sag values were measured following the test method described in ASTM D4400-99 (Reapproved 2007) "Standard Test Method for Sag Resistance of Paints Using a Multinotch Applicator." The leveling values were measured following the test method described in ASTM D4062-99 (Reapproved 2003) "Standard Test Method for Leveling of Paints by Draw-Down Method."

Color acceptance and the value of $\Delta E$ of a finished colored aqueous formulation may be determined using the rub-up test. The $\Delta E$ measurement test is often called a "test of rubbing with the finger," known to persons skilled in the art by the term "rub ups." This test consists of applying the formulation of the colored finish paint to be tested onto a test chart, waiting until the paint becomes tacky, and then applying shear stress by rubbing, with the finger, the still viscous film of paint, for 60 seconds.

After the film dries, the colorimetric difference between the shear-stressed area (rubbed area) and the non-shear-stressed area (area of the non-rubbed film), determined by measuring CIELAB color coordinates L* a* b*, makes it possible to evaluate (value of $\Delta E$) whether or not the paint composition tested may have a good pigment compatibility.

Examples

The following examples further describe and demonstrate illustrative embodiments within the scope of the present invention. The examples are given solely for illustration and are not to be construed as limitations of this invention as many variations are possible without departing from the spirit and scope thereof. For reactions using diisocyanate reactants, a catalyst such as an organo-tin or bismuth ester or an amine may be added to accelerate the reaction at the desired temperature. The reactions may be conducted under conditions to minimize branching and/or side reactions.

Paint Formulation

To test the effectiveness of the mid-shear regulating composition, several exemplary paint formulations were prepared. The below table 1 describes the semi-gloss deep tint base formulation used to test various compositions as indicated below.

TABLE 1

| Pounds | Gallons | Raw Material |
|---|---|---|
| 46.43 | 5.57 | Water |
| 0.75 | 0.07 | Cellulose Thickener |
| 7.00 | 0.36 | Attapulgite clay |
| 4.00 | 0.45 | Dispersant |
| 0.50 | 0.07 | Buffer |
| 0.50 | 0.06 | Defoamer |
| 6.00 | 0.69 | Surfactant—wetting agent |
| 12.50 | 0.57 | Extender |
| 40.60 | 1.84 | Extender—Aluminum Silicate |
| 183.62 | 22.03 | Water |
| 510.00 | 57.76 | Acrylic latex (50% solids) binder resin |
| 4.00 | 0.48 | Defoamer |
| 5.00 | 0.59 | Hiding Additive |
| 1.50 | 0.20 | Buffer |

The below table describes the semi-gloss deep tint base formulation used to test the compositions as indicated below.

TABLE 2

| Pounds | Gallons | Raw Material |
|---|---|---|
| 60.00 | 7119 | Water |
| 1.25 | 0.11 | Cellulose Thickener |
| 6.25 | 0.32 | Attapulgite clay |
| 23.50 | 2.54 | Ethylene Glycol |
| 2.50 | 0.28 | Dispersant |
| 2.00 | 0.27 | Defoamer |
| 4.00 | 0.46 | Surfactant—wetting agent |
| 20.00 | 0.93 | Extender—Aluminum Silicate |
| | Let Down | |
| 163.85 | 19.65 | Water |
| 506.00 | 57.12 | Acrylic latex (50% solids) binder resin |
| 3.00 | 0.40 | Defoamer |
| 13.00 | 1.64 | Coalescent |

Colorants were added to the base paint formulations at a rate of 12 fluid ounces per gallon of paint. The influences of various structural factors on the performance of the paint formulations were examined and are discussed below Example 1A Sample No. 3162-67-1

A viscosity regulating composition was prepared as follows: To a 500 ml reaction kettle equipped with a nitrogen inlet, stirrer, Dean Stark trap and a condenser, 48.09 g of PEG 8000 (Mn=8015, 0.006 mol), 0.607 g of 1,8-octanediol (MW=146.23, 0.003 mol) and 280 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 2.67 g of isophorone diisocyanate (IPDI) (MW=222.28: 0.012 mol) and 3 drops of K-Kat 348. The reaction is stirred at 75° C. for 1.5 hour. To this mixture, 0.95 g of 1-decanol (MW=158.29, 0.006 mol) was added and the reaction mixture was stirred at 75° C. for 1 hour. The mixture was cooled and poured onto a plastic tray to evaporate the toluene. The dried the polymer was further dried in a vacuum oven. The molar ratios of 1-decanol: polyglycol: IPDI: 1,8 octanediol are 2:2:4:1.

Example 1B

Sample A

An exemplary viscosity regulating solution composition based on the viscosity regulating composition prepared in EXAMPLE 1A, was prepared by combining 20% of the viscosity regulating composition (Sample No. 3162-67-1); 6.0% of the viscosity suppressent Sodium 2-Ethylhexyl Sulfate; and 2.0% of the viscosity suppressent Poly (propyleneglycol) 725.

Example 2

Sample No. 3162-67-1

To a 500 ml reaction kettle equipped with a nitrogen inlet, stirrer, Dean Stark trap and a condenser, 51.03 g of PEG 8000 (MW=8501, 0.006 mol), 0.439 g of 1,8-octanediol (MW=146.23, 0.003 mol) and 280 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 2.67 g of IPDI (MW=222.28: 0.012 mol) and 3 drops of K-Kat 348. The reaction is stirred at 75° C. for 1.5 hour. To this mixture, 0.95 g of 1-decanol (MW=158.29, 0.006 mol) was added and the reaction mixture was stirred at 75° C. for 1 hour. The mixture was cooled and poured onto a plastic tray to evaporate the toluene. The dried the polymer was further dried in a vacuum oven. The molar ratios of 1-decanol: polyglycol: IPDI: 1,8 octanediol are 2:2:4:1.

Example 2B

Sample A

An exemplary viscosity regulating solution composition based on the viscosity regulating composition prepared in EXAMPLE 2A, was prepared by combining 20% of the viscosity regulating composition (Sample No. 3162-67-1); 6.0% of the viscosity suppressent Sodium 2-Ethylhexyl Sulfate; and 2.0% of the viscosity suppressent Poly (propyleneglycol) 725.

Sample A was tested in the base paint formulation of Table 1 using 1.7% of sample and optionally a brown colorant. The properties of the resulting paint formulation were: Untinted KU 115; Untinted ICI 2.7; Tinted KU 96; Tinted ICI 1.9; ΔKU –1.9; ΔICI –0.8; ΔE –0.8; Rub-Up N; Sag 12; Finger Y; Leveling 8+.

Example 3A

Sample No. 1004K23002

To an external dewatering tank was added 1447 g of PEG 8000 (MW=8765, 0.165 mol) and 16.70 of 1,12-dodecanediol (MW=202.33, 0.083 mol). The tank was heated to 120° C. under nitrogen. The tank was placed under vacuum and dewatered for 4 hours at 120° C. The reaction mixture was transferred to a sigma reactor and cooled to 75° C. 73.40 g of IPDI (MW=222.28: 0.330 mol) was added to the reactor followed by 4.09 g of K-Kat 348(MW=1101,). The reaction is stirred at 75° C. for 30 minutes. To this mixture, 28.75 g of 1-decanol (MW=158.29, 0.18 mol) was added and the reaction mixture was stirred at 75° C. for 20 minutes. The batch was discharged. The molar ratios of 1-decanol: polyglycol: IPDI: 1,12-dodecanediol are 2:2:4:1.

Example 3B

Sample B

An exemplary viscosity regulating solution composition based on the viscosity regulating composition prepared in EXAMPLE 3A, was prepared by combining 25% of the viscosity regulating composition (Sample No. 1004K23002) with 15% Butyl Carbitol (a viscosity suppressent).

Sample B was tested in the base paint formulation of Table 1 using 1.7% of sample and optionally a brown colorant. The properties of the resulting paint formulation were: Untinted KU 115; Untinted ICI 2.4; Tinted KU 97; Tinted ICI 1.4; ΔKU –18 ΔICI –1; ΔE 0.73; Rub-Up N; Sag 16; Finger N; and Leveling 8.

Sample B was tested in the base paint formulation of Table 2 using 3.25% of sample and optionally a green colorant. The properties of the resulting paint formulation were: Untinted KU 109; Untinted ICI 1.9; Tinted KU 105; Tinted ICI 1.9; ΔKU –4; ΔICI 0; ΔE 0.54; Rub-Up; Sag 18 Finger N; and Leveling 9.

Sample B was also tested in the base paint formulation of Table 2 using 3.25% of sample and optionally a brown colorant. The properties of the resulting paint formulation were: Untinted KU 109; Untinted ICI 1.9; Tinted KU 94; Tinted ICI 1.4; ΔKU –15; ΔICI –0.5; ΔE 0.95; Rub-Up slightly dark; Sag 16; Finger N; and Leveling 10.

Example 4A

Sample No. 3162-67-2

To a 500 ml reaction kettle equipped with a nitrogen inlet, stirrer, Dean Stark trap and a condenser, 51.03 g of PEG 8000 (Mn=8501, 0.006 mol), 0.775 g of 1,16-hexadecanediol (MW=258.443, 0.003 mol) and 280 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 2.67 g of IPDI (MW=222.28: 0.012 mol) and 3 drops of K-Kat 348. The reaction is stirred at 75° C. for 1.5 hour. To this mixture, 0.95 g of 1-decanol (MW=158.29, 0.006 mol) was added and the reaction mixture was stirred at 75° C. for 1 hour. The mixture was cooled and poured onto a plastic tray to evaporate the toluene. The dried the polymer was further dried in a vacuum oven. The molar ratios of 1-decanol: polyglycol: IPDI: 1,16-hexadecanediol are 2:2:4:1.

Example 4B

Sample C

An exemplary viscosity regulating solution composition based on the viscosity regulating composition prepared in EXAMPLE 4A, was prepared by combining 20% of the viscosity regulating composition (Sample No. 3162-67-2); 6.0% of the viscosity suppressent Sodium 2-Ethylhexyl Sulfate; and 2.0% of the viscosity suppressent Poly (propyleneglycol) 725.

Sample C was tested in the base paint formulation of Table 1 using 1.7% of sample and optionally a brown colorant. The properties of the resulting paint formulation were: Untinted KU 119; Untinted ICI 2.4; Tinted KU 95; Tinted ICI 1.4; ΔKU −24; ΔICI −1; ΔE 0.88; Rub-Up N; Sag 14-16; Finger N; and Leveling 9.

Example 5A

Sample No. 3128-75-1/Sn cat

To a 500 ml reaction kettle equipped with a nitrogen inlet, stirrer, Dean Stark trap and a condenser, 1119.1 g of PEG 6000 (MW=5955, 0.02 mol), 1.744 g of 1, 2-decanediol (MW=174.28, 0.001 mol) and 330 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 9.05 g of IPDI (MW=222.28: 0.04 mol) and 8 drops of K-Kat 348. The reaction is stirred at 75° C. for 1.5 hour. To this mixture, 3.23 g of 1-decanol (MW=158.29, 0.002 mol) was added and the reaction mixture was stirred at 75° C. for 1 hour. The mixture was cooled and poured onto a plastic tray to evaporate the toluene. The dried the polymer was further dried in a vacuum oven. The molar ratios of 1-decanol: polyglycol: IPDI: 1,2-decanediol are 2:2:4:1.

Example 5B

Sample D

An exemplary viscosity regulating solution composition based on the viscosity regulating composition prepared in EXAMPLE 5A, was prepared by combining 25% of the viscosity regulating composition (Sample No. 3128-75-1/Sn cat.) with 15% of the viscosity suppressent Butyl Carbitol.

Sample D was tested in the base paint formulation of Table 2 using 3.25% of sample and optionally a green colorant. The properties of the resulting paint formulation were: Untinted KU 117; Untinted ICI 1.8; Tinted KU 106; Tinted IC 2; ΔKU −11; ΔICI 0.2; ΔE 0.45; Rub-Up unchanged; Sag 20; Finger N; and Leveling 5.

Sample D was also tested in the base paint formulation of Table 2 using 3.25% of sample and optionally a brown colorant. The properties of the resulting paint formulation were: Untinted KU 117; Untinted ICI 1.8; Tinted KU 97; Tinted ICI 1.7; ΔKU −20; ΔICI −0.1; ΔE 2.02; Rub-Up dark; Sag 20; Finger N; and Leveling 5.

Example 6

Sample No. 3128-89-1/Sn cat

To a 500 ml reaction kettle equipped with a nitrogen inlet, stirrer, Dean Stark trap and a condenser, 47.64 g of PEG 6000 (MW=5955, 0.008 mol), 0.81 g of 1, 2-dodecanediol (MW=202.34, 0.004 mol) and 280 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 3.63 g of IPDI (MW=222.28: 0.016 mol) and 3 drops of K-Kat 348. The reaction is stirred at 75° C. for 1.5 hour. To this mixture, 1.36 g of 1-decanol (MW=158.29, 0.006 mol) was added and the reaction mixture was stirred at 75° C. for 1 hour. The mixture was cooled and poured onto a plastic tray to evaporate the toluene. The dried the polymer was further dried in a vacuum oven. The molar ratios of 1-decanol: polyglycol: IPDI: 1,2-dodecanediol are 2:2:4:1.

Example 6B

Sample E

An exemplary viscosity regulating solution composition based on the viscosity regulating composition prepared in EXAMPLE 6A, was prepared by combining 25% of the viscosity regulating composition (Sample No. 3128-89-1/Sn cat.) with 15% of the viscosity suppressent Butyl.

Sample E was tested in the base paint formulation of Table 2 using 3.25% of sample and optionally a green colorant. The properties of the resulting paint formulation were: Untinted KU 114; Untinted ICI 1.7; Tinted KU 106; Tinted ICI 1.8; ΔKU −8; ΔICI −0.1; ΔE 0.23; Rub-Up unchanged; Sag 18; Finger N; and Leveling 7.

Sample E was also tested in the base paint formulation of Table 2 using 3.25% of sample and optionally a brown colorant. The properties of the resulting paint formulation were: Untinted KU 114; Untinted ICI 1.7; Tinted KU 95; Tinted ICI 1.6; ΔKU −19; ICI −0.1; ΔE 1.39; Rub-Up slightly dark; Sag 18; Finger N; and Leveling 6.

Example 7

A: (Sample No. 3148-7-2/Bi cat.)

To a 500 ml reaction kettle equipped with a nitrogen inlet, stirrer, Dean Stark trap and a condenser, 47.64 g of PEG 6000 (Mn=5955, 0.006 mol), 0.70 g of 1, 2-decanediol (MW=174.28, 0.003 mol) and 280 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 3.60 g of IPDI (MW=222.28: 0.012 mol) and 3 drops of K-Kat 348. The reaction is stirred at 75° C. for 1.5 hour. To this mixture, 1.40 g of 1-decanol (MW=158.29, 0.006 mol) was added and the reaction mixture was stirred at 75° C. for 1 hour. The mixture was cooled and poured onto a plastic tray to evaporate the toluene. The dried the polymer was further dried in a vacuum oven. The molar ratios of 1-decanol: polyglycol: IPDI: 1,2-decanediol are 2:2:4:1.

Example 7B

Sample F

An exemplary viscosity regulating solution composition based on the viscosity regulating composition prepared in EXAMPLE 6A, was prepared by combining 25% of the viscosity regulating composition (Sample No. 3148-7-2/Bi cat.) with 15% of the viscosity suppressent Butyl Carbitol.

Sample F was tested in the base paint formulation of Table 2 using 3.25% of sample and optionally a green colorant. The properties of the resulting paint formulation were: Untinted KU 114; Untinted IC 2; Tinted KU 105; Tinted ICI 2.2; ΔKU −9; ΔICI −0.2; ΔE 0.31; Rub-Up --; Sag 16; Finger N; and Leveling 7.

Sample F was also tested in the base paint formulation of Table 2 using 3.25% of sample and optionally a brown colorant. The properties of the resulting paint formulation were: Untinted KU 114; Untinted IC 2; Tinted KU 96; Tinted ICI 1.7; ΔKU−18; ICI −0.3; ΔE 1.58; Rub-Up --; Sag 16; Finger N; and Leveling 7.

Example 8A

Sample No. 3148-11-1/Bi cat

To a 500 ml reaction kettle equipped with a nitrogen inlet, stirrer, Dean Stark trap and a condenser, 36 g of PEG 6000 (MW=5955, 0.008 mol), 0.81 g of 1, 2-dodecanediol (MW=202.34, 0.004 mol) and 280 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 3.56 of IPDI (MW=222.28, 0.016 mol) 3 drops of K-Kat 348. The reaction is stirred at 75° C. for 1.5 hour. To this mixture, 1.42 g of 1-decanol (MW=158.29, 0.008 mol) was added and the reaction mixture was stirred at 75° C. for 1 hour. The mixture was cooled and poured onto a plastic tray to evaporate the toluene. The dried the polymer was further dried in a vacuum oven. The molar ratios of 1-decanol: polyglycol: IPDI: 1,2-dodecanediol are 2:2:4:1.

Example 8B

Sample G

An exemplary viscosity regulating solution composition based on the viscosity regulating composition prepared in EXAMPLE 8A, was prepared by combining 25% of the viscosity regulating composition (Sample No. 3148-11-1/Bi cat.) with 15% of the viscosity suppressent Butyl Carbitol.

Sample G was tested in the base paint formulation of Table 2 using 3.25% of sample and optionally a green colorant. The properties of the resulting paint formulation were: Untinted KU 108; Untinted ICI 1.7; Tinted KU 100; Tinted ICI 1.9; ΔKU −8; ΔICI −0.2; ΔE 0.15; Rub-Up --; Sag 12; Finger Y; and Leveling 10.

Sample G was also tested in the base paint formulation of Table 2 using 3.25% of sample and optionally a brown colorant. The properties of the resulting paint formulation were: Untinted KU 108; Untinted ICI 1.7; Tinted KU 90; Tinted ICI 1.4; ΔKU −18; ΔICI −0.3; ΔE 0.57; Rub-Up --; Sag 12; Finger Y; and Leveling 10.

Example 9A

Sample No. 3148-20-1

To a 500 ml reaction kettle equipped with a nitrogen inlet, stirrer, Dean Stark trap and a condenser, 46.75 g of PEG 6000 (MW=5844, 0.008 mol), 0.81 g of 1, 2-dodecanediol (MW=202.34, 0.004 mol) and 280 g of toluene were added. The reaction mixture was stirred at 250 rpm and dewatered at 130° C., with a N2 purge, 0.5 ml/min, to remove 120 ml of the toluene/$H_2O$ mixture. The reaction was cooled to 75° C. followed by addition of 3.60 g of IPDI (MW=222.28: 0.016 mol) and 3 drops of K-Kat 348. The reaction is stirred at 75° C. for 1.5 hour. To this mixture, 1.35 g of 1-decanol (MW=158.29, 0.008 mol) was added and the reaction mixture was stirred at 75° C. for 1 hour. The mixture was cooled and poured onto a plastic tray to evaporate the toluene. The dried the polymer was further dried in a vacuum oven. The molar ratios of 1-decanol: polyglycol: IPDI: 1,2-dodecanediol are 2:2:4:1.

Example 9B

Sample H

An exemplary viscosity regulating solution composition based on the viscosity regulating composition prepared in EXAMPLE 9A, was prepared by combining 25% of the viscosity regulating composition (Sample No. 3148-20-1) with 15% of the viscosity suppressent Butyl Carbitol.

Sample H was tested in the base paint formulation of Table 2 using 3.25% of sample and optionally a green colorant. The properties of the resulting paint formulation were: Untinted KU 110; Untinted IC 2; Tinted KU 103; Tinted ICI 2.2; ΔKU −7; ΔICI 0.2; ΔE 0.35; Rub-Up --; Sag 14; Finger N; and Leveling 9.

Sample H was also tested in the base paint formulation of Table 2 using 3.25% of sample and optionally a brown colorant. The properties of the resulting paint formulation were: Untinted KU 110; Untinted IC 2; Tinted KU 92; Tinted ICI 1.8; ΔKU−18; ΔICI −0.2; ΔE 0.73; Rub-Up unchanged; Sag 12; Finger N; and Leveling 9.

Example 10

Sample No. 3148-20-2

To a 500 ml reaction kettle equipped with a nitrogen inlet, stirrer, Dean Stark trap and a condenser, 46.75 g of PEG 6000 (MW 5844, 0.008 mol), 0.84 g of 1, 12-dodecanediol (MW=202.34, 0.004 mol) and 280 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 3.60 g of IPDI (MW=222.28: 0.016 mol) and 3 drops of K-Kat 348. The reaction is stirred at 75° C. for 1.5 hour. To this mixture, 1.35 g of 1-decanol (MW=158.29, 0.008 mol) was added and the reaction mixture was stirred at 75° C. for 1 hour. The mixture was cooled and poured onto a plastic tray to evaporate the toluene. The dried the polymer was further dried in a vacuum oven. The molar ratios of 1-decanol:polyglycol:IPDI:1,12-dodecanediol are 2:2:4:1.

Example 10B

Sample J

An exemplary viscosity regulating solution composition based on the viscosity regulating composition prepared in EXAMPLE 10A, was prepared by combining 25% of the viscosity regulating composition (Sample No. 3148-20-2) with 15% of the viscosity suppressent Butyl Carbitol.

Sample J was tested in the base paint formulation of Table 2 using 3.25% of sample and optionally a green colorant. The properties of the resulting paint formulation were: Untinted KU 112; Untinted ICI 1.8; Tinted KU 106; Tinted ICI 2.2; ΔKU −6; ΔICI 0.4; ΔE 0.32; Rub-Up --; Sag >24; Finger N; and Leveling 6.

Sample J was also tested in the base paint formulation of Table 2 using 3.25% of sample and optionally a brown colorant. The properties of the resulting paint formulation were: Untinted KU 112; Untinted ICI 1.8; Tinted KU 97; Tinted ICI 1.8; ΔKU −15; ΔICI 0; ΔE 2.82; Rub-Up dark; Sag >24; Finger N; and Leveling 6.

Example 11A

Sample No. 3162-70-2

To a 500 ml reaction kettle equipped with a nitrogen inlet, stirrer, Dean Stark trap and a condenser, 51 g of PEG 8000 (Mn=8501, 0.006 mol), 0.607 g of 1, 12-dodecanediol (MW=202.34, 0.003 mol) and 280 g of toluene were added. The reaction mixture was stirred at 250 rpm and dewatered at 130° C., with a N2 purge, 0.5 ml/min, to remove 120 ml of the toluene/$H_2O$ mixture. The reaction was cooled to 75° C. followed by addition of 2.02 g of Hexamethylene diisocyanate (HDI) (MW=168.2: 0.012 mol) and 3 drops of K-Kat 348. The reaction is stirred at 75° C. for 1.5 hour. To this mixture, 1.455 g of ISOFOL 16 (or 2-hexyl-1-Decanol) (MW=242.4406, 0.006 mol) was added and the reaction mixture was stirred at 75° C. for 1 hour. The mixture was cooled and poured onto a plastic tray to evaporate the toluene. The dried the polymer was further dried in a vacuum oven. The molar ratios of ISOFOL 16: polyglycol: HDI: 1, 12-dodecanediol are 2:2:4:1.

Example 11B

Sample K

An exemplary viscosity regulating solution composition based on the viscosity regulating composition prepared in EXAMPLE 11A, was prepared by combining 20% of the viscosity regulating composition (Sample No. 3162-70-2); 6.0% of the viscosity suppressent Sodium 2-Ethylhexyl Sulfate; and 2.0% of the viscosity suppressent Poly (propyleneglycol) 725.

Example 12A

Sample No. 3162-53-5

To a 500 ml reaction kettle equipped with a nitrogen inlet, stirrer, Dean Stark trap and a condenser, 51 g of PEG 8000 (MW=8501, 0.006 mol), 0.608 g of 1, 12-dodecanediol (MW=202.34, 0.003 mol) and 280 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 2.67 g of IPDI (MW=222.28: 0.012 mol) and 3 drops of K-Kat 348. The reaction is stirred at 75° C. for 1.5 hour. To this mixture, 1.12 g of ISOFOL 12 (MW=186.336, 0.006 mol) was added and the reaction mixture was stirred at 75° C. for 1 hour. The mixture was cooled and poured onto a plastic tray to evaporate the toluene. The dried the polymer was further dried in a vacuum oven. The molar ratios of ISOFOL 12:polyglycol:IPDI:1,12-dodecanediol are 2:2:4:1.

Example 12B

Sample L

An exemplary viscosity regulating solution composition based on the viscosity regulating composition prepared in EXAMPLE 12A, was prepared by combining 20% of the viscosity regulating composition (Sample No. 3162-53-5); 6.0% of the viscosity suppressent Sodium 2-Ethylhexyl Sulfate; and 2.0% of the viscosity suppressent Poly (propyleneglycol) 725.

Sample L was tested in the base paint formulation of Table 1 using % of sample and optionally a brown colorant. The properties of the resulting paint formulation were: Untinted KU 120; Untinted ICI 2.5; Tinted KU 100; Tinted ICI 1.5; ΔKU −20; ΔICI −1; ΔE 0.48; Rub-Up N; Sag 16; Finger N; and Leveling 8.

Example 13A

Sample No. 3162-30-7

To a 500 ml reaction kettle equipped with a nitrogen inlet, stirrer, Dean Stark trap and a condenser, 48.5 g of PEG 8000 (MW=8088, 0.006 mol), 0.607 g of 1, 12-dodecanediol (MW=202.34, 0.003 mol) and 280 g of toluene were added. The reaction mixture was stirred at 250 rpm and dewatered at 130° C., with a N2 purge, 0.5 ml/min, to remove 120 ml of the toluene/$H_2O$ mixture. The reaction was cooled to 75° C. followed by addition of 3.15 g of Desmodur® W (MW=262: 0.012 mol) and 4 drops of K-Kat 348. The reaction is stirred at 75° C. for 1.5 hour. To this mixture, 0.95 g of 1-decanol (MW=158.2828, 0.006 mol) was added and the reaction mixture was stirred at 75° C. for 1 hour. The mixture was cooled and poured onto a plastic tray to evaporate the toluene. The dried the polymer was further dried in a vacuum oven. The molar ratios of 1-decanol:polyglycol:Desmodur®W:1,12-dodecanediol are 2:2:4:1.

Example 13B

Sample M

An exemplary viscosity regulating solution composition based on the viscosity regulating composition prepared in EXAMPLE 13A, was prepared by combining 20% of the viscosity regulating composition (Sample No. 3162-30-7); 6.0% of the viscosity suppressent Sodium 2-Ethylhexyl Sulfate; and 2.0% of the viscosity suppressent Poly (propyleneglycol) 725.

Sample M was tested in the base paint formulation of Table 1 using 5% of sample and optionally a brown colorant. The properties of the resulting paint formulation were: Untinted KU 119; Untinted ICI 2.5; Tinted KU 100; Tinted ICI 1.5; ΔKU −19; ΔICI −1; ΔE 0.34; Rub-Up N; Sag 16; Finger N; and Leveling 8-. EXAMPLE 14A: (Sample No. 3162-58-1)

To a 500 ml reaction kettle equipped with a nitrogen inlet, stirrer, Dean Stark trap and a condenser, 51.0 g of PEG 8000 (MW=8500, 0.006 mol), 0.607 g of 1, 12-dodecanediol (MW=202.34, 0.003 mol) and 280 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 3.144 g of Desmodur® W (MW=262: 0.012 mol) and 3 drops of K-Kat 348. The reaction is stirred at 75° C. for 1.5 hour. To this mixture, 0.781 g of 2-ethyl-1-hexanol (MW=130.229, 0.006 mol) was added and the reaction mixture was stirred at 75° C. for 1 hour. The mixture was cooled and poured onto a plastic tray to evaporate the toluene. The dried the polymer was further dried in a vacuum oven. The molar ratios of 2-ethyl-1-hexanol: polyglycol: Desmodur® W: 1,8 octanediol are 2:2:4:1.

Example 14B

Sample N

An exemplary viscosity regulating solution composition based on the viscosity regulating composition prepared in EXAMPLE 14A, was prepared by combining 20% of the viscosity regulating composition (Sample No. 3162-58-1); 6.0% of the viscosity suppressent Sodium 2-Ethylhexyl Sulfate; and 2.0% of the viscosity suppressent Poly (propyleneglycol) 725.

Example 15A

Sample No. 3162-58-2

To a 500 ml reaction kettle equipped with a nitrogen inlet, stirrer, Dean Stark trap and a condenser, 51.0 g of PEG 8000 (Mn 8500, 0.006 mol), 0.607 g of 1, 12-dodecanediol (MW=202.34, 0.003 mol) and 280 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 3.144 g of Desmodur® W (MW=262: 0.012 mol) and 3 drops of K-Kat 348. The reaction is stirred at 75° C. for 1.5 hour. To this mixture, 0.39 g of 2-ethyl-1-hexanol (MW=130.229, 0.003 mol) and 0.56 g of ISOFOL 12 (MW=186.336, 0.003 mol) were added and the reaction mixture was stirred at 75° C. for 1 hour. The mixture was cooled and poured onto a plastic tray to evaporate the toluene. The dried the polymer was further dried in a vacuum oven. The molar ratios of 2-ethyl-1-hexanol/Isofol 12: polyglycol: Desmodur® W: 1,12-dodecanediol are 2:2:4:1.

Example 15B

Sample P

An exemplary viscosity regulating solution composition based on the viscosity regulating composition prepared in EXAMPLE 15A, was prepared by combining 20% of the viscosity regulating composition (Sample No. 3162-58-2); 6.0% of the viscosity suppressent Sodium 2-Ethylhexyl Sulfate; and 2.0% of the viscosity suppressent Poly (propyleneglycol) 725.

Example 16A

Sample No. 3162-40-1

To a 500 ml reaction kettle equipped with a nitrogen inlet, stirrer, Dean Stark trap and a condenser, 48.53 g of PEG 8000 (MW=8088, 0.006 mol), 0.607 g of 1, 12-dodecanediol (MW=202.34, 0.003 mol) and 280 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 3.144 g of Desmodur® W (MW=262: 0.012 mol) and 3 drops of K-Kat 348. The reaction is stirred at 75° C. for 1.5 hour. To this mixture, 1.21 g of 1, 2-dodecanediol (MW=202.34, 0.006 mol) was added and the reaction mixture was stirred at 75° C. for 1 hour. The mixture was cooled and poured onto a plastic tray to evaporate the toluene. The dried the polymer was further dried in a vacuum oven. The molar ratios of 1,2-dodecanediol: polyglycol: Desmodur® W: 1,12-dodecanediol are 2:2:4:1.

Example 16B

Sample R

An exemplary viscosity regulating solution composition based on the viscosity regulating composition prepared in EXAMPLE 16A, was prepared by combining 20% of the viscosity regulating composition (Sample No. 3162-40-1); 6.0% of the viscosity suppressent Sodium 2-Ethylhexyl Sulfate; and 2.0% of the viscosity suppressent Poly (propyleneglycol) 725.

Sample R was tested in the base paint formulation of Table 1 using 3.4% of sample and optionally a brown colorant. The properties of the resulting paint formulation were: Untinted KU 122; Untinted ICI 2.4; Tinted KU 99; Tinted ICI 1.4; ΔKU −23; ΔICI −1; ΔE 0.28; Rub-Up light; Sag 14-16; Finger N; and Leveling 8.

Example 17A

Sample No. 3162-54-2

To a 500 ml reaction kettle equipped with a nitrogen inlet, stirrer, Dean Stark trap and a condenser, 51.0 g PEG 8000 (Mn=8501, 0.006 mol), 1.61 g of Pripol 2033 (MW=570, 0.003 mol) and 280 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 2.67 g of IPDI (MW=222.28: 0.012 mol) and 3 drops of K-Kat 348. The reaction is stirred at 75° C. for 1.5 hour. To this mixture, 0.95 g of 1-decanol (MW=158.29, 0.006 mol) was added and the reaction mixture was stirred at 75° C. for 1 hour. The mixture was cooled and poured onto a plastic tray to evaporate the toluene. The dried the polymer was further dried in a vacuum oven. The molar ratios of 1-decanol: polyglycol:IPDI:Pripol2033 are 2:2:4:1.

Example 17B

Sample S

An exemplary viscosity regulating solution composition based on the viscosity regulating composition prepared in EXAMPLE 17A, was prepared by combining 20% of the viscosity regulating composition (Sample No. 3162-54-2); 6.0% of the viscosity suppressent Sodium 2-Ethylhexyl Sulfate; and 2.0% of the viscosity suppressent Poly (propyleneglycol) 725.

Example 18A

Sample No. 3128-80-2

To a 500 ml reaction kettle equipped with a nitrogen inlet, stirrer, Dean Stark trap and a condenser, 47.64 g of PEG 6000 (MW=5955, 0.008 mol), 0.70 g of 1, 2-decanediol (MW=174.28, 0.004 mol) and 280 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 3.63 g of IPDI (MW=222.28: 0.016 mol) and 3 drops of K-Kat 348. The reaction is stirred at 75° C. for 1.5 hour. To this mixture, 1.15 g of 1-nonanol (MW=144.26, 0.008 mol) was added and the reaction mixture was stirred at 75° C. for 1 hour. The mixture was cooled and poured onto a plastic tray to evaporate the toluene. The dried the polymer was further dried in a vacuum oven. The molar ratios of 1-nonanol:polyglycol:IPDI:1,2-decanediol are 2:2:4:1.

Example 18B

Sample T

An exemplary viscosity regulating solution composition based on the viscosity regulating composition prepared in EXAMPLE 18A, was prepared by combining 25% of the viscosity regulating composition (Sample No. 3128-80-2) with 15% of the viscosity suppressant Butyl Carbitol.

Sample T was tested in the base paint formulation of Table 2 using 3.25% of sample and optionally a green colorant. The properties of the resulting paint formulation were: Untinted KU 106; Untinted ICI 1.7; Tinted KU 98; Tinted ICI 1.6; ΔKU −8; ΔICI −0.1; ΔE 0.45; Rub-Up unchanged; and Sag 16.

Sample T was tested in the base paint formulation of Table 2 using 3.25% of sample and optionally a brown colorant. The properties of the resulting paint formulation were: Untinted KU 106; Untinted ICI 1.7; Tinted KU 90; Tinted ICI 1.4; ΔKU −16; ΔICI −0.3; ΔE 0.8; Rub-Up dark; and Sag 10.

Example 19A

Sample No. 3148-33-2

To a 500 ml reaction kettle equipped with a nitrogen inlet, stirrer, Dean Stark trap and a condenser, 48.09 g of PEG 8000 (Mn=8015, 0.006 mol), 0.607 g of 1,12-dodecanediol (MW=202.33, 0.003 mol) and 280 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 2.67 g of IPDI (MW=222.28: 0.012 mol) and 3 drops of K-Kat 348. The reaction is stirred at 75° C. for 1.5 hour. To this mixture, 0.95 g of 1-decanol (MW=158.29, 0.006 mol) was added and the reaction mixture was stirred at 75° C. for 1 hour. The mixture was cooled and poured onto a plastic tray to evaporate the toluene. The dried the polymer was further dried in a vacuum oven. The molar ratios of 1-decanol: polyglycol: IPDI: 1,12-dodecanediol are 2:2:4:1.

Example 19B

Sample U(RD2009-077)

An exemplary viscosity regulating solution composition based on the viscosity regulating composition prepared in EXAMPLE 19A, was prepared by combining 20% of the viscosity regulating composition (Sample U(RD2009-077)) 6.0% of the viscosity suppressant Sodium 2-Ethylhexyl Sulfate; and 2.0% of the viscosity suppressant Poly (propyleneglycol) 725.

Example 20A

Sample No. 3162-52-4

To a 500 ml reaction kettle equipped with a nitrogen inlet, stirrer, Dean Stark trap and a condenser, 51.0 g of PEG 8000 (Mn=8501, 0.006 mol), 0.81 g of 1,12-dodecanediol (MW=202.33, 0.004 mol) and 280 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 2.67 g of IPDI (MW=222.28: 0.012 mol) and 3 drops of K-Kat 348. The reaction is stirred at 75° C. for 1.5 hour. To this mixture, 0.63 g of 1-decanol (MW=158.29, 0.004 mol) was added and the reaction mixture was stirred at 75° C. for 1 hour. The mixture was cooled and poured onto a plastic tray to evaporate the toluene. The dried the polymer was further dried in a vacuum oven. The molar ratios of 1-decanol: polyglycol: IPDI: 1,12-dodecanediol are 2:3:6:2.

Example 20B

Sample W

An exemplary viscosity regulating solution composition based on the viscosity regulating composition prepared in EXAMPLE 20A, was prepared by combining 20% of the viscosity regulating composition (Sample No. 3162-52-4) 6.0% of the viscosity suppressant Sodium 2-Ethylhexyl Sulfate; and 2.0% of the viscosity suppressant Poly (propyleneglycol) 725.

Example 21A

Sample No. 3148-52-1, comparative

To a 500 ml reaction kettle equipped with a nitrogen inlet, stirrer, Dean Stark trap and a condenser, 52.42 g of PEG 8000 (Mn=8736, 0.006 mol), and 280 g of toluene were added. The reaction mixture was stirred at 250 rpm and dewatered at 130° C., with a $N_2$ purge, 0.5 ml/min, to remove 120 ml of the toluene/$H_2O$ mixture. The reaction was cooled to 75° C. followed by addition of 5.36 g of IPDI (MW=222.28: 0.024 mol) and 3 drops of K-Kat 348. The reaction is stirred at 75° C. for 1.5 hour. To this mixture, 5.70 g of 1-decanol (MW=158.29, 0.036 mol) was added and the reaction mixture was stirred at 75° C. for 1 hour. The mixture was cooled and poured onto a plastic tray to evaporate the toluene. The dried the polymer was further dried in a vacuum oven. The molar ratios of 1-decanol: polyglycol: IPDI: diol are 6:1:4:0.

Example 21B

Sample X

An exemplary viscosity regulating solution composition based on the viscosity regulating composition prepared in EXAMPLE 21A, was prepared by combining 20% of the viscosity regulating composition (Sample No. 3148-52-1) 6.0% of the viscosity suppressant Sodium 2-Ethylhexyl Sulfate; and 2.0% of the viscosity suppressant Poly (propyleneglycol) 725.

Sample X was tested in the base paint formulation of Table 2 using 3.25% of sample and optionally a green colorant. The properties of the resulting paint formulation were: Untinted KU 106; Untinted ICI 1.7; Tinted KU 97; Tinted ICI 1.9; ΔKU −9; ΔICI 0.2; ΔE 0.49; Sag 18; and Leveling 4, 5.

Sample X was also tested in the base paint formulation of Table 2 using 3.25% of sample and optionally a brown colorant. The properties of the resulting paint formulation were: Untinted KU 106; Untinted ICI 1.7; Tinted KU 87; Tinted ICI 1.6; ΔKU −19; ΔICI −0.1; ΔE 0.97; Sag 14; and Leveling 5, 6.

Example 22

Sample No. 3162-59-2

An exemplary viscosity regulating solution composition based on the viscosity regulating composition prepared in EXAMPLE 14A, was prepared by combining 20% of the viscosity regulating composition (Sample No. 3162-58-1) 6.0% of the viscosity suppressent Sodium 2-Ethylhexyl Sulfate; and 2.0% of the viscosity suppressent Poly (propyleneglycol) 725.

Sample 3162-59-2 was tested in the base paint formulation of Table 1 using 3.4% of sample and optionally a brown colorant. The properties of the resulting paint formulation were: Untinted KU 119; Untinted ICI 2.4; Tinted KU 99; Tinted ICI 1.4; ΔKU −20; ΔICI; ΔE 0.30; Rub-Up N; Sag 20; Finger N; and Leveling 8-.

Example 23

Sample No. 3162-59-3

An exemplary viscosity regulating solution composition based on the viscosity regulating composition prepared in EXAMPLE 14A, was prepared by combining 20% of the viscosity regulating composition (Sample No. 3162-58-2) 6.0% of the viscosity suppressent Sodium 2-Ethylhexyl Sulfate; and 2.0% of the viscosity suppressent Poly (propyleneglycol) 725.

Sample 3162-59-3 was tested in the base paint formulation of Table 1 using 4.4% of sample and optionally a brown colorant. The properties of the resulting paint formulation were: Untinted KU 120; Untinted ICI 2.3; Tinted KU 99; Tinted ICI 1.3; ΔKU −21; ICI −1; ΔE 0.13; Rub-Up N; Sag 18; Finger N; and Leveling 8.

Sample 3162-55-2 was tested in the base paint formulation of Table 1 using 2.6% of sample and optionally a brown colorant. The properties of the resulting paint formulation were: Untinted KU 107; Untinted ICI 2.6; Tinted KU 89; Tinted ICI 1.7; ΔKU −18; ICI −0.9; ΔE 1.42; Rub-Up Slight; Sag --; Finger --; and Leveling --.

Comparative Example 1

A comparative example (sample no. 3148-52-1) was prepared following the synthesis procedure of Example 1 but in the absence of a diol reactant. The reactants were 1-decanol, IPDI and polyglycol at reactant mole ratios of 2:3:2 resulting in a product having an average molecular weight of 8700 g/mole.

Example 25

Several exemplary aqueous thickening compositions, containing various surfactants, were prepared. The viscosity regulation composition used in each aqueous thickening composition was 1004K22301. The compositions and corresponding viscosity are illustrated in Tables 3 and 4. These data demonstrate that viscosity suppression can be accomplished with both anionic and nonionic surfactants. Anionic surfactants, in general, are more effective in suppressing viscosity. Anionic surfactants with smaller hydrophobic groups are more effective than surfactants with longer hydrophobic groups.

TABLE 5

|  |  | NDL 5.2 | NDL 9.8 | NASQ 5/2 | NBSQ 5/5 | NLSP 2/4 | RL 433/09 A | VSLE 12/100 | NLS 3** |
|---|---|---|---|---|---|---|---|---|---|
| Surfactant | 10 wt. % |  |  |  |  |  |  |  |  |
| Structure | alcohol | C10 branched | C10 branched | C11-branched | C9-11 | 2-ethylhexyl | C8-10 | 2-ethylhexyl* | 2-ethylhexyl |
|  | PO |  |  |  |  | 2 | 2 |  |  |
|  | EO | 5 | 10 | 5 | 5 | 4 | 4 | 12 | 4 |
|  | PO |  |  | 2 | 5 |  |  | * |  |
| Sample 1004K22302 | 20 wt. % |  |  |  |  |  |  |  |  |
| Viscosity 23° C. (mPa · s) |  | 5400 | 7600 | 5700 | 7200 | 8000 | 5300 | 9100 | 2300 |

* = VSLE 12/100:

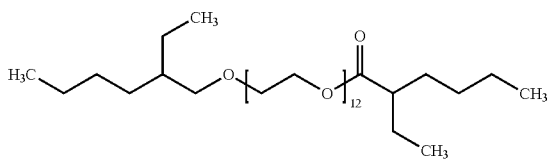

Example 24

Sample No. 3162-55-2

An exemplary viscosity regulating solution composition based on the viscosity regulating composition prepared in EXAMPLE 14A, was prepared by combining 20% of the viscosity regulating composition (Sample No. 3162-54-2) 6.0% of the viscosity suppressent Sodium 2-Ethylhexyl Sulfate; and 2.0% of the viscosity suppressent Poly (propyleneglycol) 725.

TABLE 6

| Polymer (%) | Surfactant | Surfactant (%) | Viscosity (cPs) |
|---|---|---|---|
| 20% | RHODAPON BOS (Sodium 2EH sulfate) | 10% | 1,396 |
| 20% | MA-80E (Sodium di(1,3-dimethylbutyl)sulfosuccinate) | 10% | 1,463 |
| 20% | AY-100 (Sodium diamyl sulfosuccinate) | 10% | 2,307 |

TABLE 6-continued

| Polymer (%) | Surfactant | Surfactant (%) | Viscosity (cPs) |
|---|---|---|---|
| 20% | RL487/09A (Stripped Linear C8 + EO5) | 10% | 4,199 |
| 20% | RL487/09 (Linear C8 + EO5) | 10% | 4,252 |
| 20% | PCC 2EH-5 (2-ethyl hexanol + EO5) | 10% | 4,449 |
| 20% | RL486/09A (Stripped 2EH + EO4) | 10% | 4,989 |
| 20% | ETHAL EH-5 (2-ethyl hexanol + EO5) | 10% | 6,924 |
| 20% | Berol 840 (C8 alcohol + EO4) | 10% | 7,774 |
| 20% | RL486/09 (2EH + EO4) | 10% | 9,923 |

The present disclosure may be embodied in other specific forms without departing from the spirit or essential attributes of the invention. Accordingly, reference should be made to the appended claims, rather than the foregoing specification, as indicating the scope of the disclosure. Although the foregoing description is directed to the preferred embodiments of the disclosure, it is noted that other variations and modification will be apparent to those skilled in the art, and may be made without departing from the spirit or scope of the disclosure.

What is claimed:

1. A viscosity regulating composition comprising a polymer, said polymer containing an internal hydrophobic unit located within the polymer's backbone; and one or more terminal hydrophobic units covalently connected to said internal hydrophobic unit, wherein said internal hydrophobic unit has multiple hydrophobic segments, wherein the multiple hydrophobic linking segments are covalently connected to each other by at least one connecting functional group independently selected from the group consisting of an amido functional group (—C(=O)—NH), urethane functional group (O—C(=O)—NH), urea functional group (N(R)—C(=O)—NH) or mixtures thereof; and wherein said one or more terminal hydrophobic units contain from 12 to 29 carbon atoms exclusive of the linking group carbon atoms.

2. The composition of claim 1, wherein the internal hydrophobic unit contains from 24 carbon atoms to 60 carbon atoms, exclusive of the linking group carbon atoms.

3. The composition of claim 1, wherein the internal hydrophobic unit contains from 24 carbon atoms to 38 carbon atoms exclusive of the linking group carbon atoms.

4. The composition of claim 3, wherein the internal hydrophobic unit contains at least one linear, branched or alicyclic aliphatic diradical as a hydrophobic segment.

5. The composition of claim 4, wherein the internal hydrophobic unit contains connected segments derived from a diisocyanate compound and a di-functional compound having isocyanate reactive functional moieties.

6. The composition of claim 5, wherein the di-functional compound has two terminal isocyanate reactive functional moieties.

7. The composition of claim 5, wherein the di-functional compound has one terminal isocyanate reactive functional moiety and one non-terminal isocyanate reactive moiety.

8. The composition of claim 5, wherein the di-functional compound has two non-terminal isocyanate reactive moiety.

9. The composition of claim 1, wherein said one or more terminal hydrophobic units contain from 17 to 25 carbon atoms exclusive of the linking group carbon atoms.

10. The composition of claim 1, wherein the terminal hydrophobic unit contains connected segments derived from a diisocyanate compound and a mono-functional compound having one isocyanate reactive functional reactive moiety.

11. The composition of claim 1, wherein at least a portion of the terminal hydrophobic units are connected to one end of the internal hydrophobic unit by one or more hydrophilic linking units.

12. The composition of claim 11, wherein the hydrophilic linking unit has an average number of carbon atoms 6 to 18 times greater than the average number of carbon atoms in the internal hydrophobic unit.

13. The composition of claim 11, wherein the connected segments of the terminal hydrophobic unit are not linked to one another by one or more polyether polyol units.

14. An aqueous thickening composition comprising:
   15-25 wt. % of the viscosity regulating composition according to claim 1;
   5-15 wt. % as actives of a surfactant selected from the unit consisting of a nonionic surfactant and an anionic surfactant; and
   at least 45 wt. % of water;
wherein said aqueous thickening composition has a viscosity of up to 25,000 cP.

15. The aqueous thickening composition according to claim 14, where in the composition has a viscosity of up to 15,000 cP.

16. The aqueous thickening composition according to claim 14, where in the composition has a viscosity of up to 10000 cP.

17. The aqueous thickening composition according to claim 14, where in the composition has a viscosity of up to 2500 cP.

18. The aqueous thickening composition of claim 14, wherein each nonionic surfactant and anionic surfactant include a hydrophobic group and a hydrophilic group, said hydrophobic group having from 6 carbon atoms to 10 carbon atoms.

19. The aqueous thickening composition of claim 14, wherein the anionic surfactant is selected from the group consisting of: sodium 2-ethylhexyl sulfate; sodium hexylsulfate; sodium octylsulfate, sodium dioctyl sulfosuccinate; ammonium 2-ethylhexyl sulfate; ammonium hexylsulfate; ammonium octylsulfate, ammonium dioctyl sulfosuccinate and mixtures thereof.

20. The aqueous thickening composition of claim 14, wherein the nonionic surfactant is 2-ethylhexyl ethoxylate having 2-5 moles ethylene oxide.

21. A method to impart a paint viscosity recovery period following application of a high shear stress comprising the steps of:
   providing a paint composition comprising:
   10-40 wt. % solids of a resin system;
   0.0-2.0 wt. % actives of an associative thickener;
   0.1-2.0 wt. % actives of a viscosity regulating composition according to claim 1; and
   optionally 7-12 wt. % of a colorant composition;
   wherein said paint formulation has a Stormer viscosity value ranging from 90-120 KU and ICI viscosity value ranging from 1 to 4.5 Poise;
   wherein after being subjected to an initial low shear (0.1/sec) conditioning step for 50 seconds followed by a high shear structure-breakdown step (1000/sec) for 50 seconds, recovery to the initial viscosity (measured at 0.1/sec) requires at least 5 minutes.

* * * * *